Figure 1:
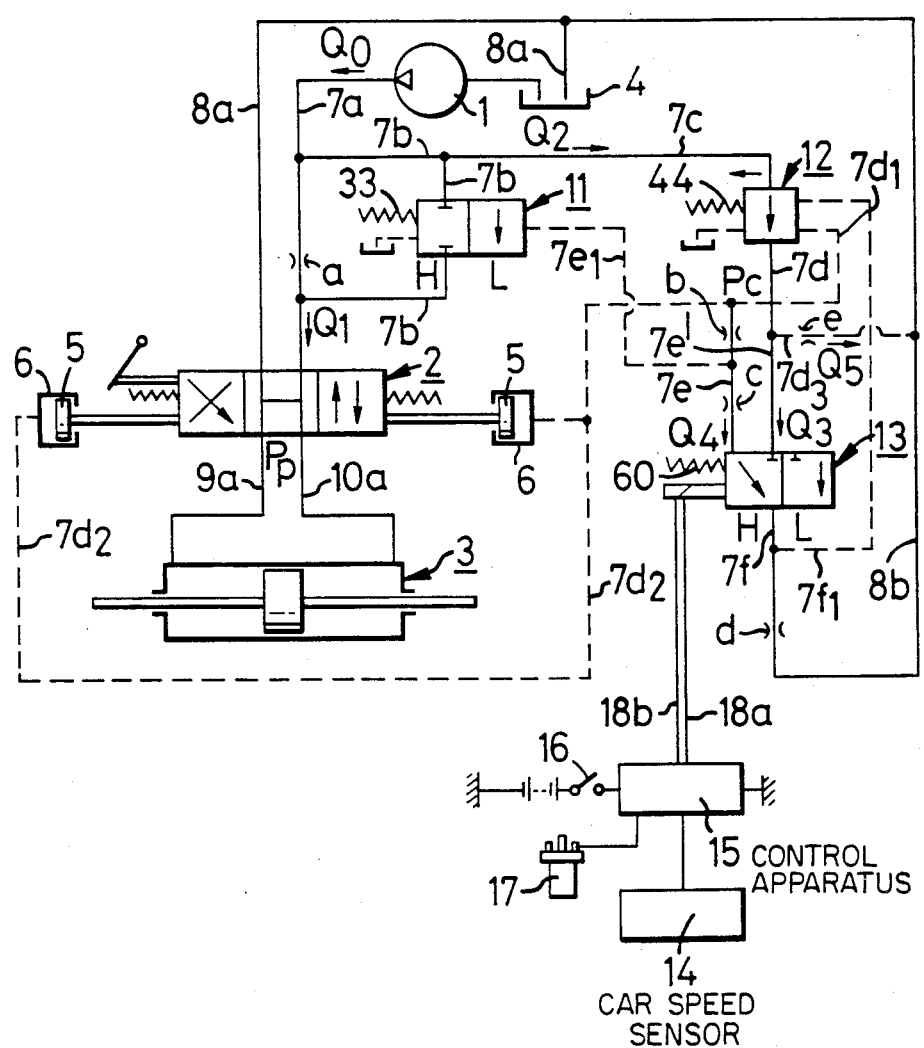

United States Patent [19]
Yoshida

[11] Patent Number: 4,651,622
[45] Date of Patent: Mar. 24, 1987

[54] POWER STEERING SYSTEM

[75] Inventor: Hiroshi Yoshida, Okazaki, Japan

[73] Assignee: Mitsubishi Jidosha Kogyo Kabushiki Kaisha, Tokyo, Japan

[21] Appl. No.: 747,375

[22] Filed: Jun. 21, 1985

Related U.S. Application Data

[63] Continuation of Ser. No. 594,479, Mar. 27, 1984, abandoned.

[30] Foreign Application Priority Data

Jun. 10, 1983 [JP] Japan ................................. 58-102922

[51] Int. Cl.$^4$ ............................................. F15B 9/10
[52] U.S. Cl. ..................................... 91/370; 91/375 R
[58] Field of Search ..................... 91/375 A, 370, 371, 91/372, 373

[56] References Cited

U.S. PATENT DOCUMENTS

| | | | |
|---|---|---|---|
| 3,867,870 | 2/1975 | Shimoura | 91/375 A |
| 3,930,554 | 1/1976 | Ward | 91/375 A |
| 3,998,131 | 12/1976 | Adams | 91/375 A |
| 4,034,825 | 7/1977 | Adams | 91/375 A |

Primary Examiner—Robert E. Garrett
Assistant Examiner—Mark Williamson
Attorney, Agent, or Firm—Wenderoth, Lind & Ponack

[57] ABSTRACT

An improvement in a known power steering system of the type in which movement of a steering wheel is transmitted via a torsion bar to an oil path switching valve to actuate a power cylinder in a desired steering direction by switching a high pressure oil path extending from an oil pump to the oil path switching valve and a low pressure oil path extending from the oil path switching valve to an oil tank. A part of the working oil flowing through the high pressure oil path is led to a reaction piston to restrain torsion of the torsion bar. The improvement is constituted by a cylindrical portion formed in the output shaft so as to surround the end portion on the output shaft side of the input shaft, a plurality of reaction pistons disposed within the cylindrical portion of the output shaft along their center lines lying on a plane perpendicular to the center axis of the input shaft and arrayed radially at an equal interval in a circumferential direction, a control oil path branched from the high pressure oil path and communicating with the reaction pistons, and a plurality of longitudinal grooves formed in the outer peripheral surface of the end portion on the output shaft side of the input shaft along the center axis of the input shaft and engaged with protrusions on the reaction pistons.

1 Claim, 44 Drawing Figures

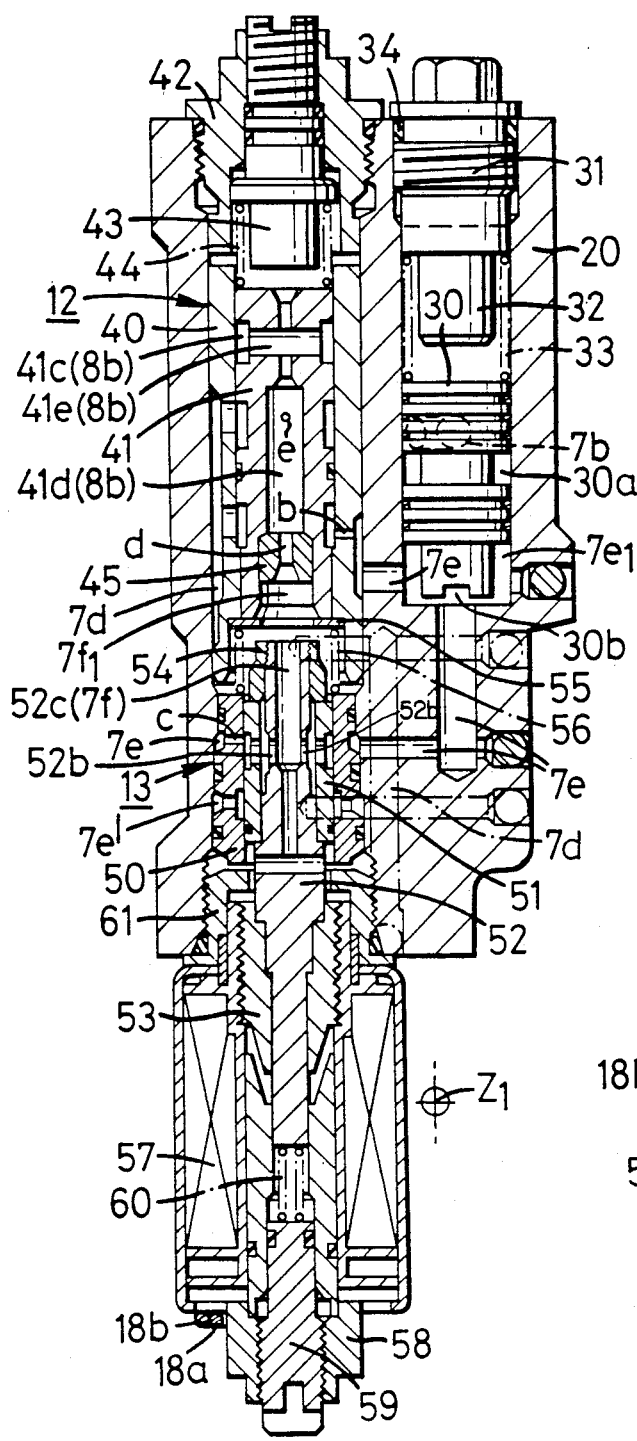
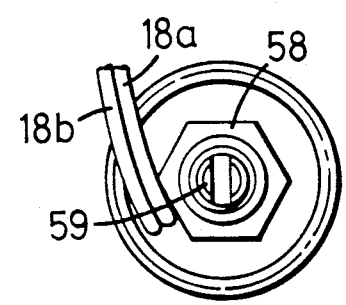
FIG.8(I)
FIG.8(II)

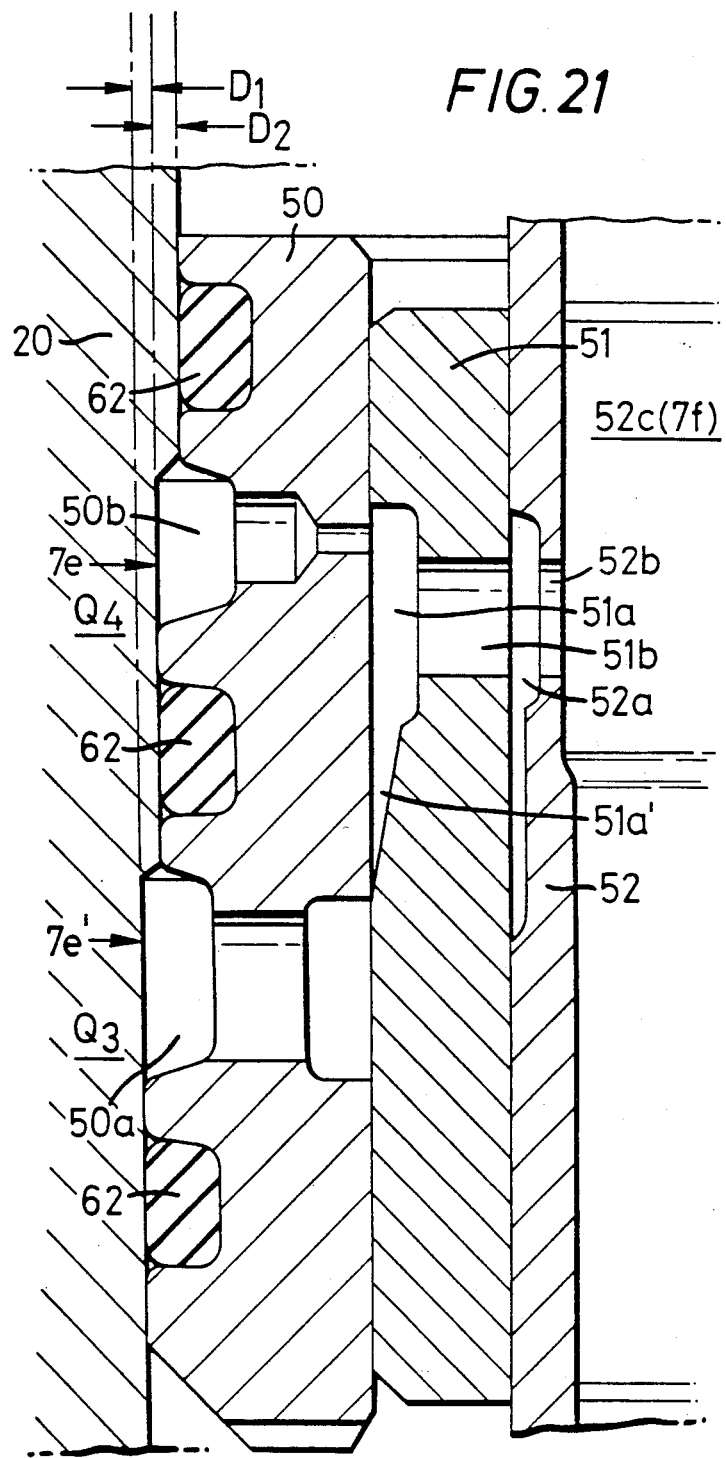

POWER STEERING SYSTEM

This application is a continuation of now abandoned application Ser. No. 594,479 filed Mar. 27, 1984.

The present invention relates to improvements in a power steering system of the type in which movement of a steering wheel is transmitted via a torsion bar to an oil path switching valve to actuate a power cylinder in a desired steering direction by switching a high pressure oil path extending from an oil pump to the oil path switching valve and a low pressure oil path extending from the oil path switching valve to an oil tank and a part of working oil flowing through the high pressure oil path is led to a reaction piston to restrain torsion of the torsion bar.

Various designs of a power steering system of the above-mentioned type have been heretofore known. However, some known power steering systems of the above-mentioned type had a shortcoming that the reaction effect produced by the reaction piston was not sufficient and it was difficult to arbitrarily preset a torsion torque of the reaction effect.

It is therefore one object of the present invention to provide an improved power steering system in which a large reaction effect can be obtained and a torsion torque of the reaction effect can be arbitrarily preset.

According to one feature of the present invention, there is provided a power steering system comprising a cylindrical input shaft coupled to a steering wheel, a torsion bar extending through the inside of the cylindrical input shaft with one end fixedly secured to one end portion of the input shaft and the other end projected from the other open end portion of the input shaft for transmitting rotation of the input shaft to the output shaft, an oil path switching valve in which oil paths are switched according to a rotational angle difference between the input shaft and the output shaft, a power cylinder coupled to the output shaft, a high pressure oil path for supplying working oil delivered from an oil pump to the power cylinder via the oil path switching valve, a cylindrical portion formed in the output shaft so as to surround the end portion on the output shaft side of the input shaft, a plurality of reaction pistons disposed within the cylindrical portion of the output shaft along their center lines lying on a plane perpendicular to the center axis of the input shaft and arrayed radially at an equal interval in a circumferential direction, a control oil path branched from the high pressure oil path and communicating with the reaction pistons, and a plurality of longitudinal grooves formed in the outer peripheral surface of the end portion on the output shaft side of the input shaft along the center axis of the input shaft and engaged with a protrusion of the reaction pistons.

Figure 2:
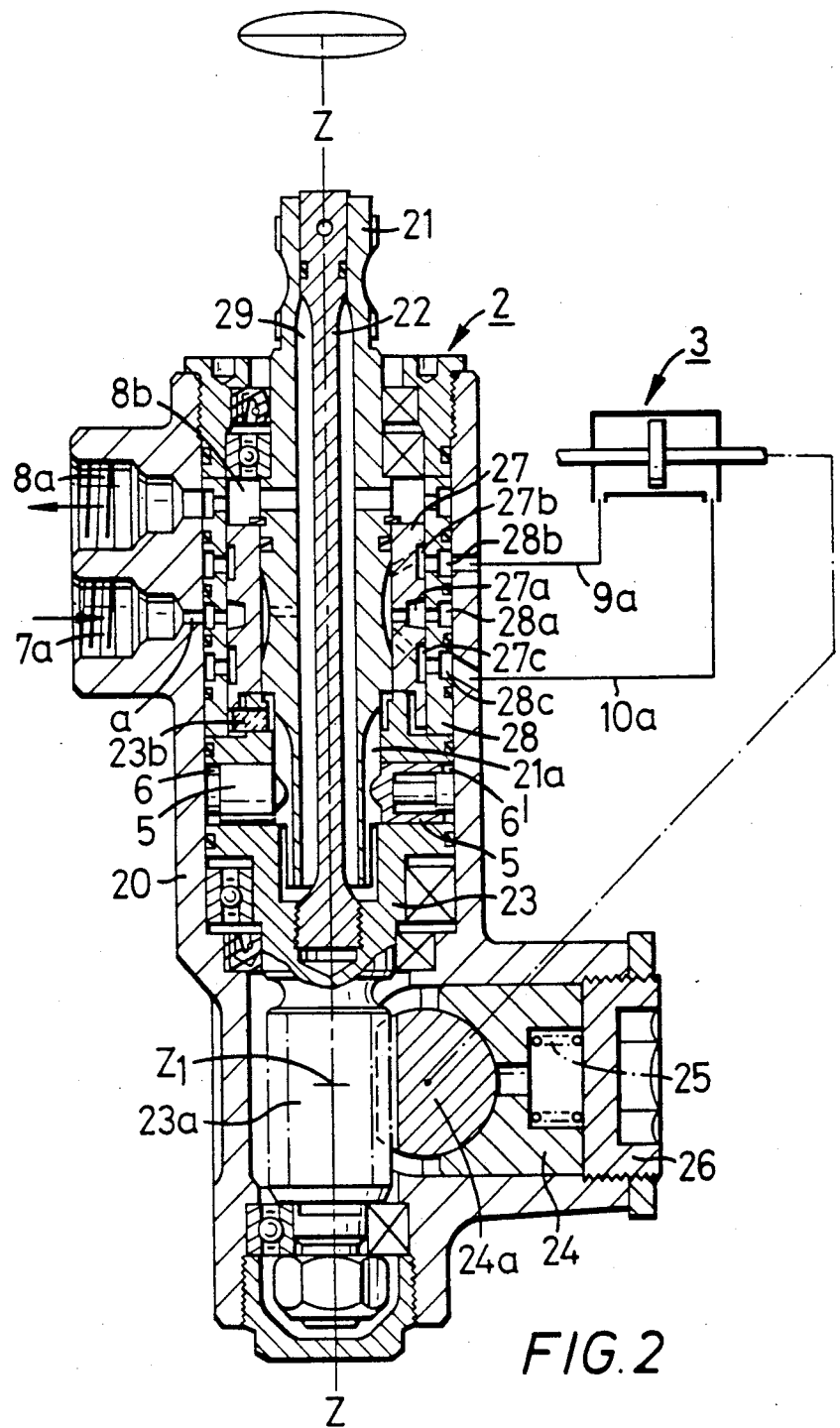
Figure 3:
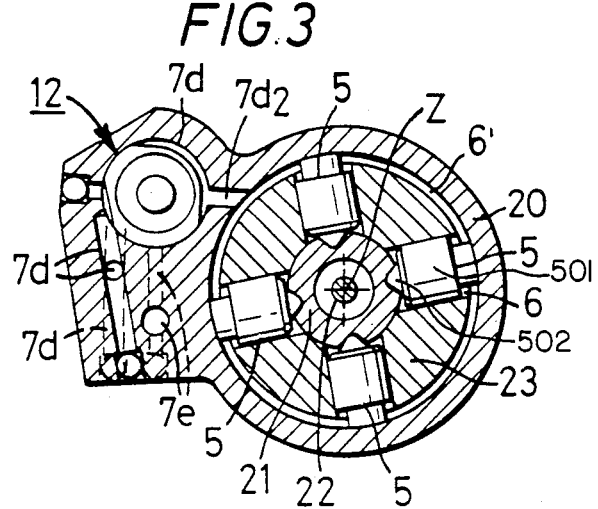
Figure 4:
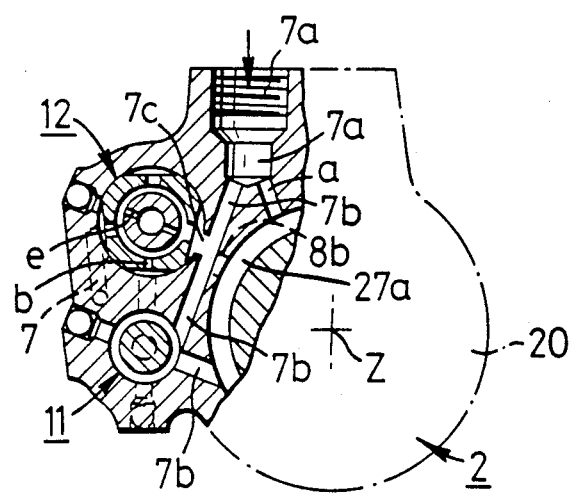
Figure 5:
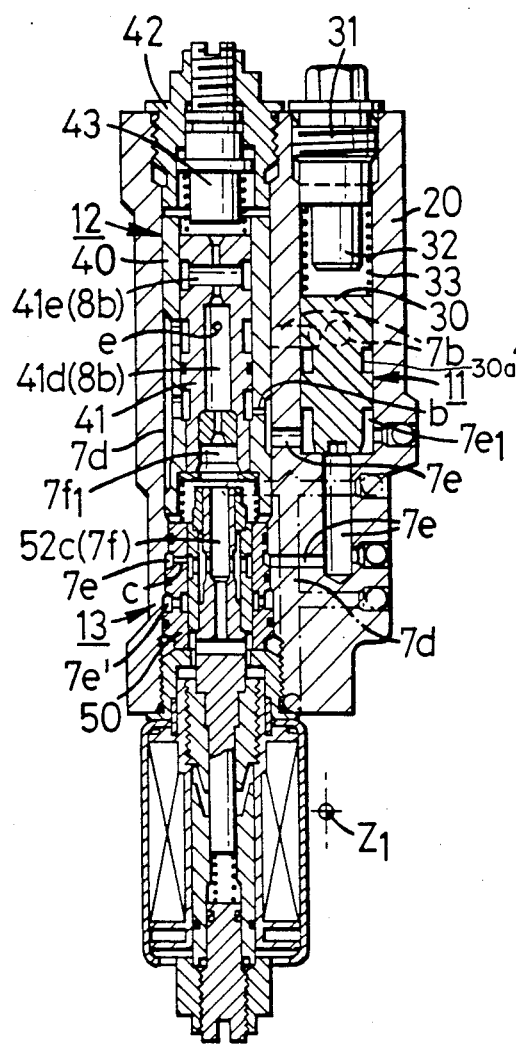
Figure 6:
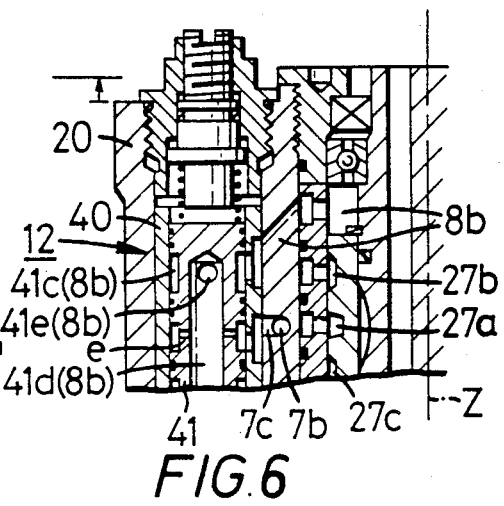
Figure 7:
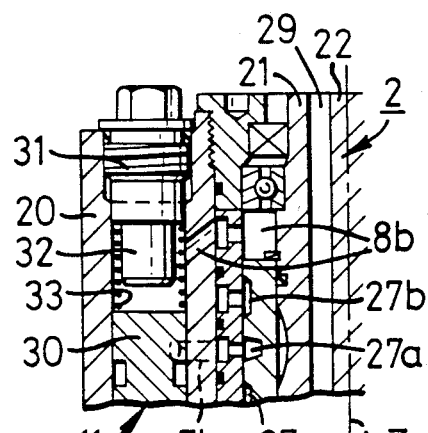
Figure 10:
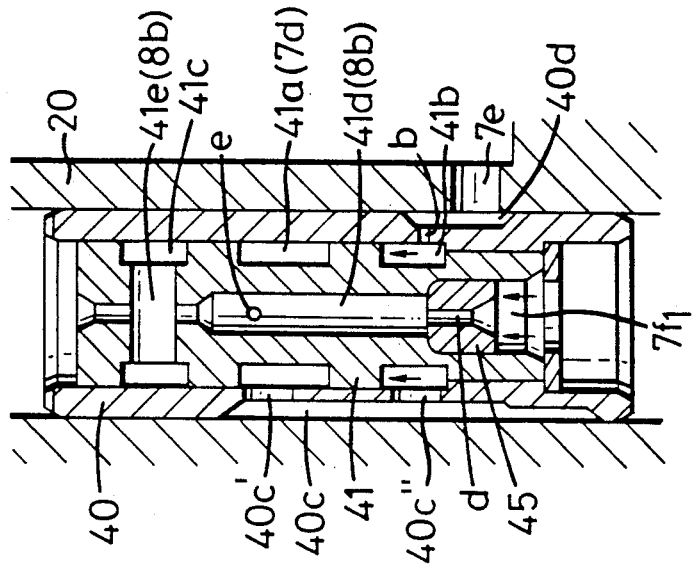
Figure 9:
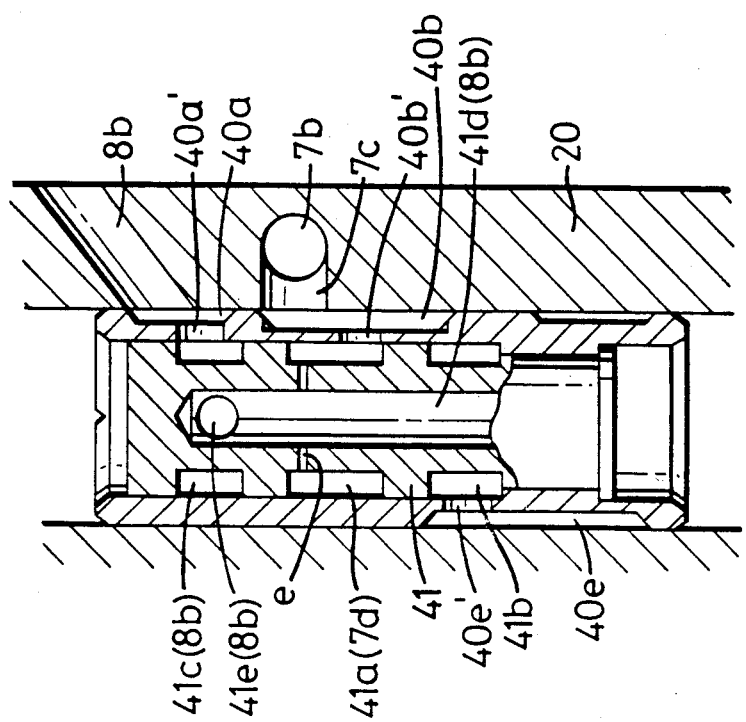
Figure 11:
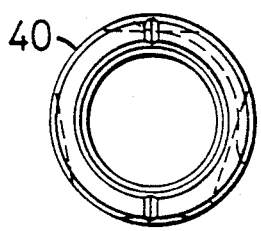
Figure 13:
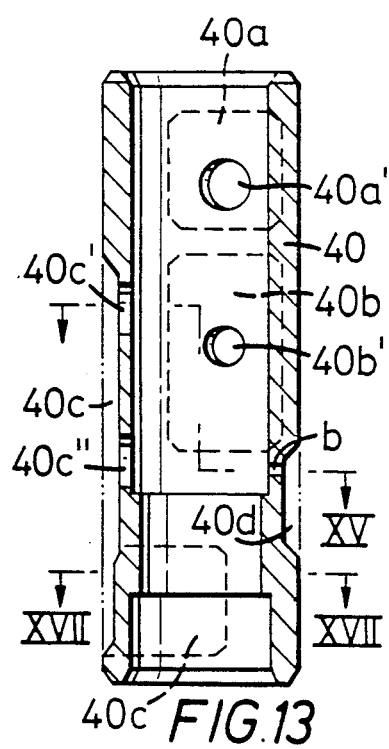
Figure 12:
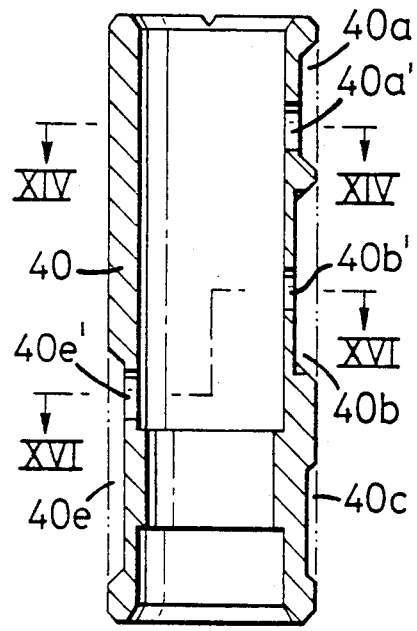
Figure 14:
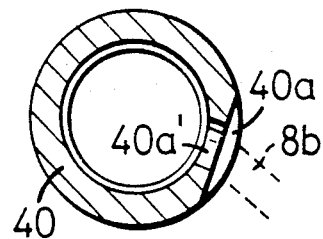
Figure 17:
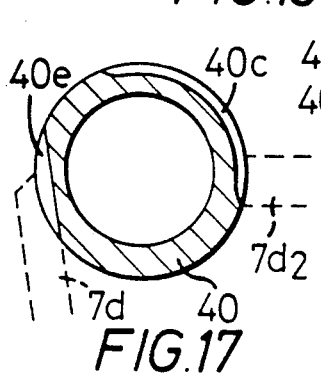
Figure 16:
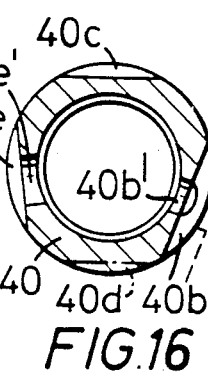
Figure 15:
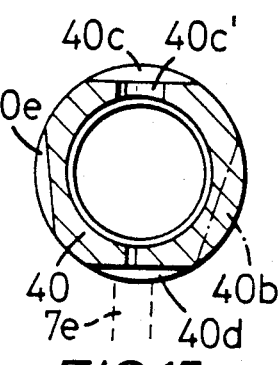
Figures 18, 19, 20:
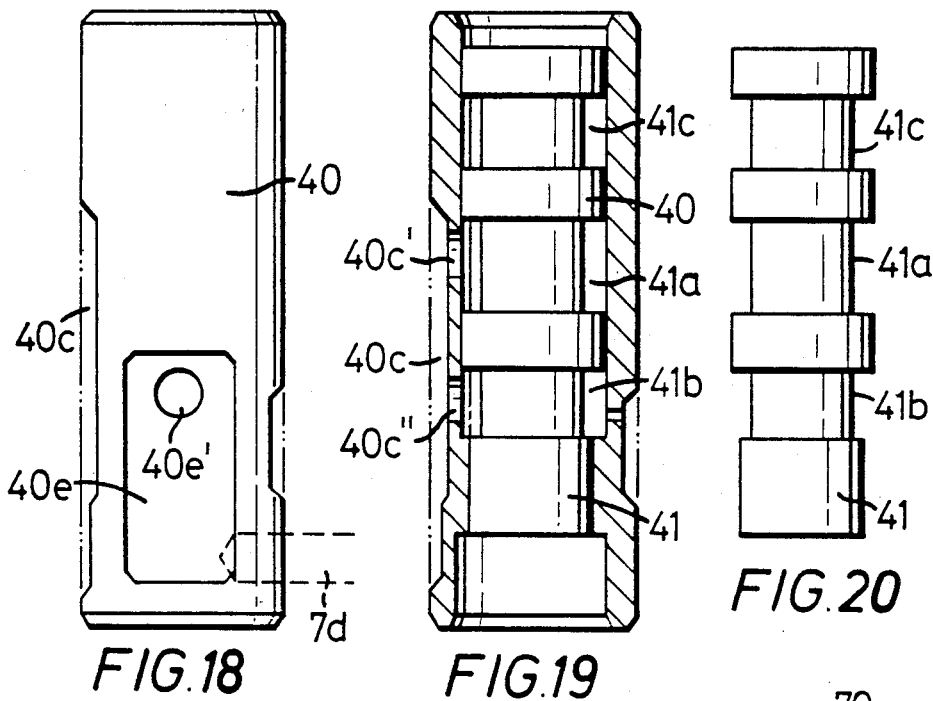
Figure 22:
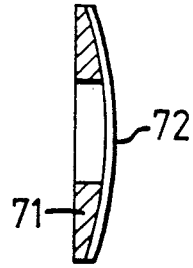
Figure 23:
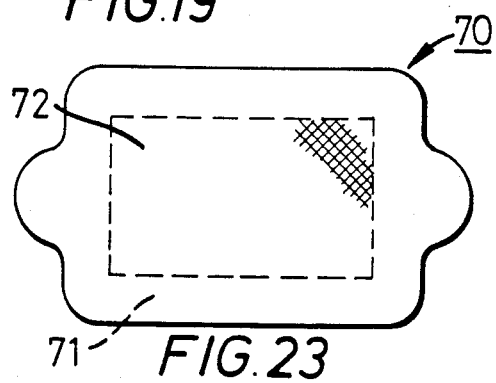
Figure 24:
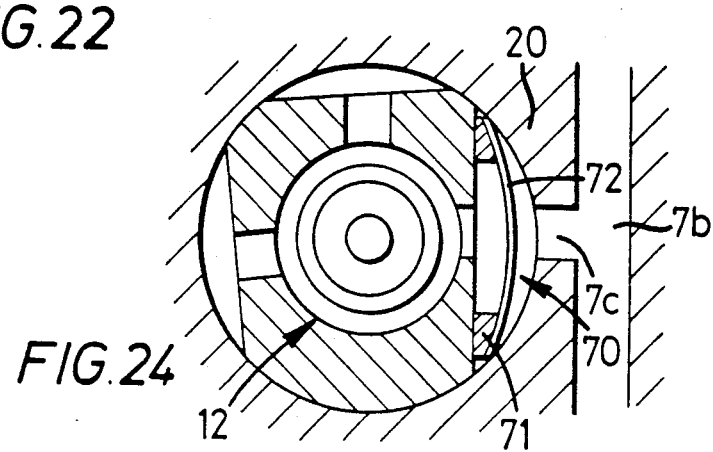
Figure 25:
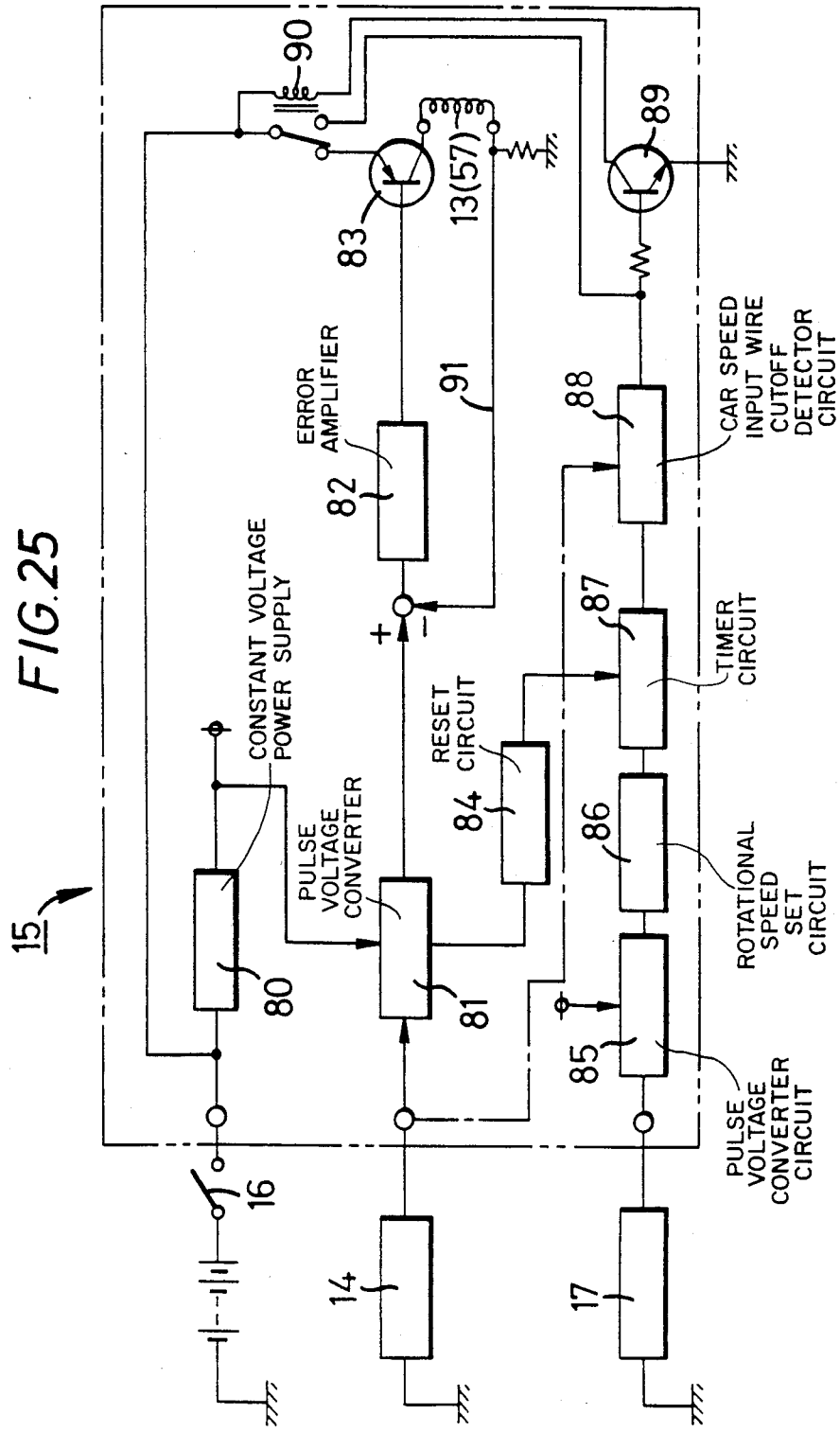
Figure 26:
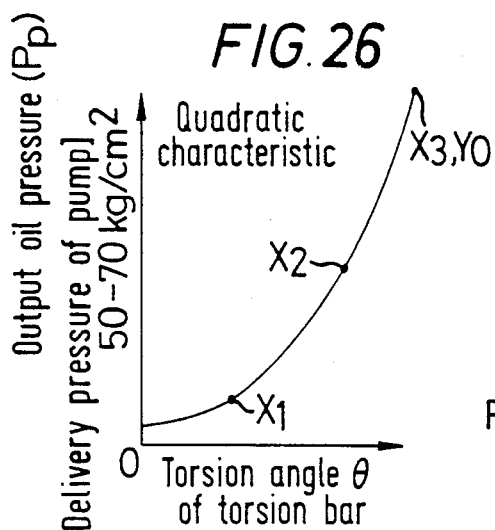
Figure 27:
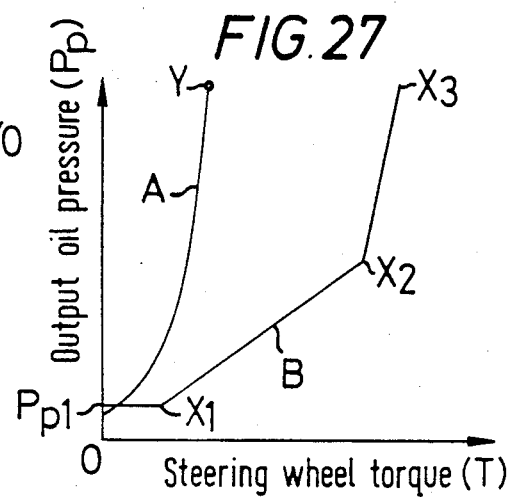
Figure 28:
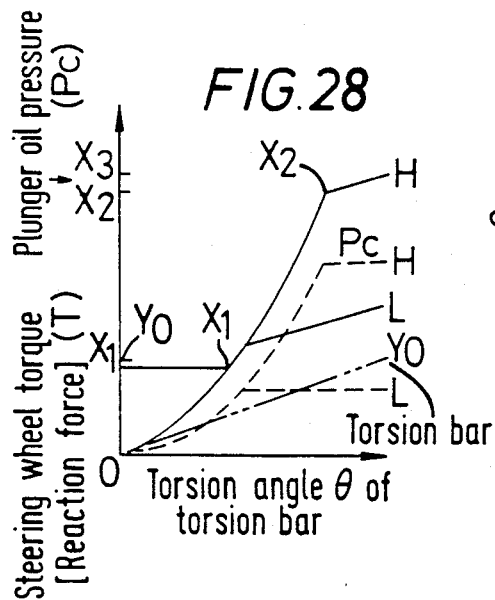
Figure 29:
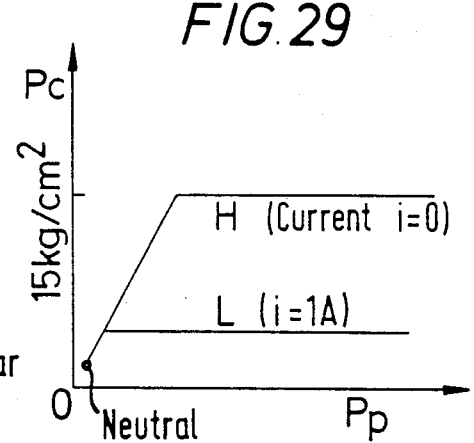
Figure 30:
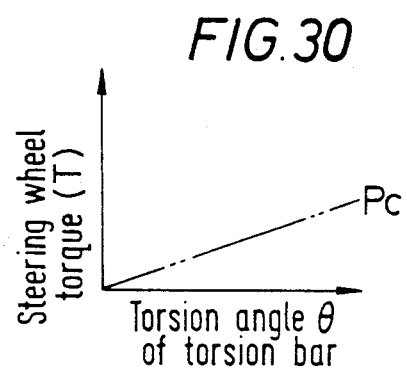
Figure 31:
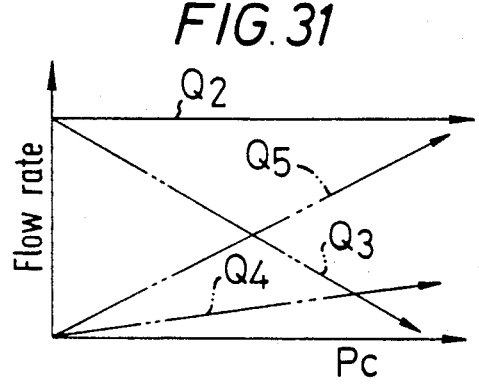
Figure 32:
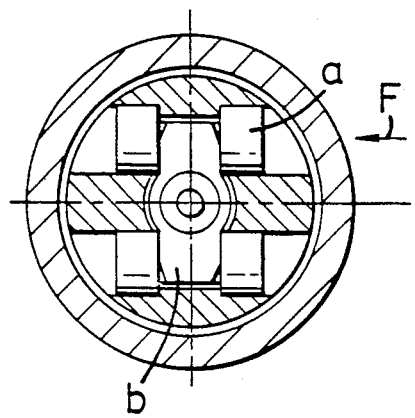
Figure 33:
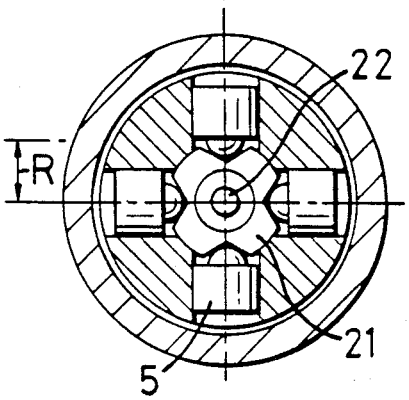
Figure 34:
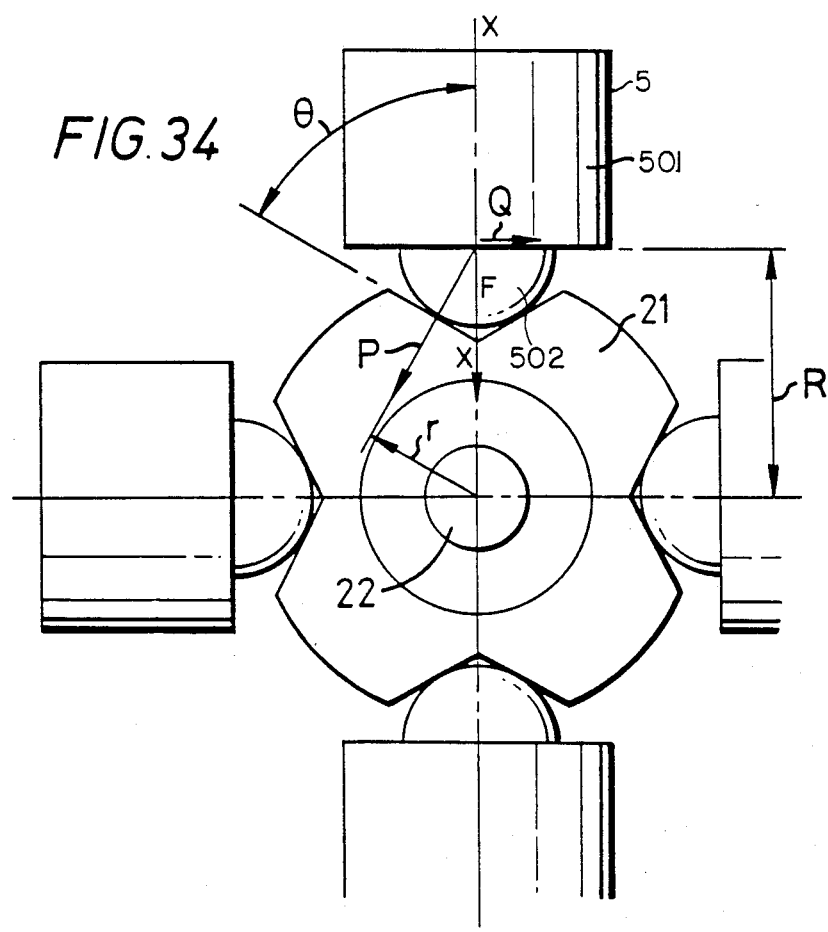
Figure 35:
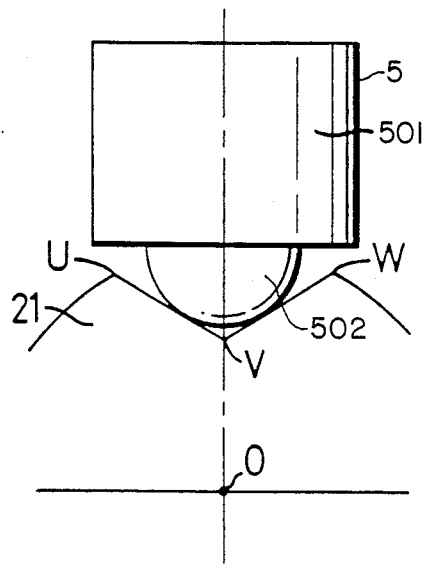
Figure 36:
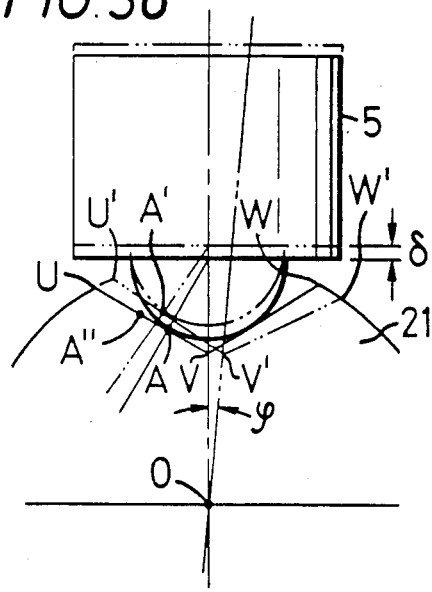
Figure 37:
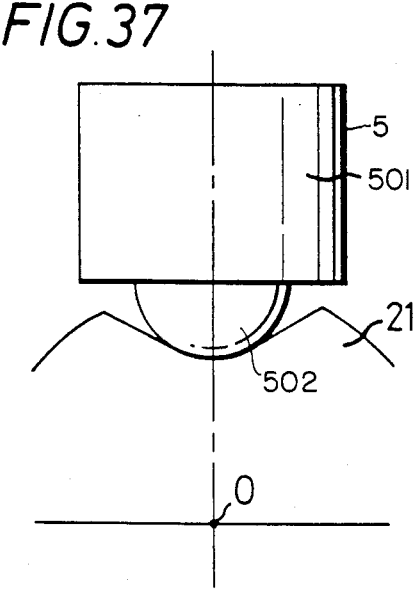
Figure 38:
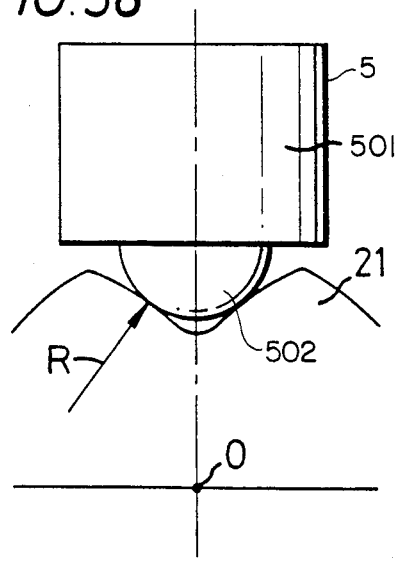
Figure 39:
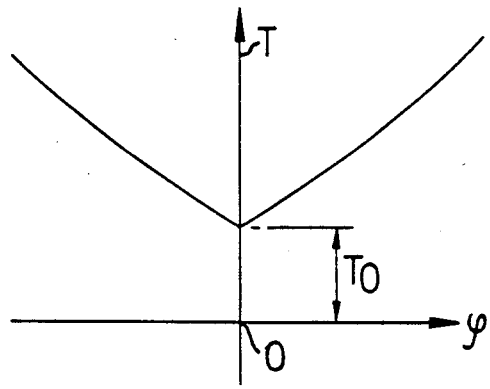
Figure 40:
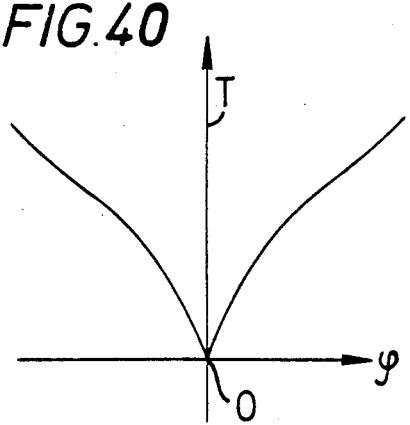
Figure 41:
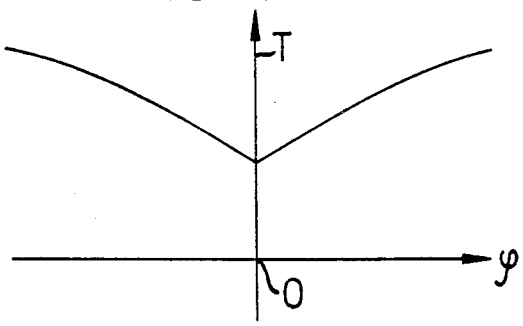
Figure 42:
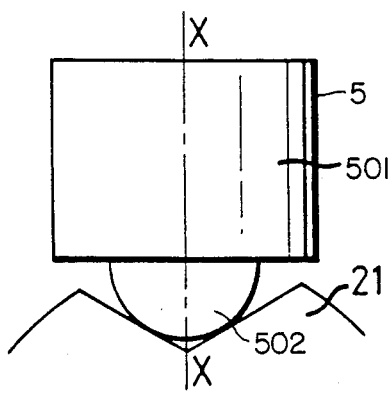
Figure 43:
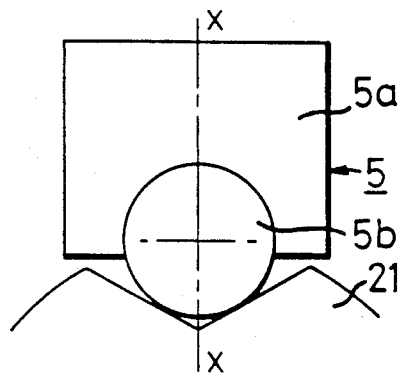

The above-described and other features and objects of the present invention will become more apparent by reference to the following description of preferred embodiments of the invention taken in conjunction with the accompanying drawings, wherein:

FIG. 1 is an oil hydraulic circuit diagram showing one preferred embodiment of a power steering system according to the present invention, FIG 2. is a longitudinal cross-section of an oil path switching valve, FIG. 3 is a transverse cross-section of a lower portion of the same valve, FIG. 4 is a transverse cross-section of an upper portion of the same valve, FIG. 5 is a longitudinal cross-section of a change-over valve, a pressure control valve and a flow rate control valve, FIG. 6 is another longitudinal cross-section of the oil path switching valve and the pressure control valve, FIG. 7 is another longitudinal cross-section of the oil path switching valve and the change-over valve, FIG. 8(I) is an enlarged longitudinal cross-section of the change-over valve, the pressure control valve and the flow rate control valve, FIG. 8 (II) is an end view of the flow rate control valve, FIG. 9 is an enlarged longitudinal cross-section of the pressure control valve, FIG. 10 is another enlarged longitudinal cross-section of the same valve, FIG. 11 is an enlarged plan view of the sleeve in the pressure control valve, FIG. 12 is an enlarged longitudinal cross-section of the same sleeve, FIG. 13 is another enlarged longitudinal cross-section of the same sleeve, FIG. 14 is a transverse cross-section taken along line XIV—XIV in FIG. 12 as viewed in the direction of the arrows, FIG. 15 is a transverse cross-section taken along line XV—XV in FIG. 13 as viewed in the direction of the arrows, FIG. 16 is a transverse cross-section taken along line XVI—XVI in FIG. 12 as viewed in the direction of the arrows, FIG. 17 is a transverse cross-section taken along line XVII—XVII in FIG. 13 as viewed in the direction of the arrows, FIG. 18 is a side view of the sleeve in the same pressure control valve, FIG. 19 is a longitudinal cross-section showing the sleeve and a spool in the same valve, FIG. 20 is a side view showing the same spool, FIG. 21 is an enlarged longitudinal cross-section of a sleeve and a spool in the flow rate control valve, FIG. 22 is a transverse cross-section of a filter, FIG. 23 is a front view of the same filter, FIG. 24 is a transverse cross-section showing a mounted state of the same filter, FIG. 25 is a circuit diagram of a control apparatus, FIG. 26 is a schematic diagram showing the relation between the output oil pressure of an oil path switching valve (a delivery pressure of a pump) and the torsion angle of a torsion bar (a relative angular displacement between a spool and an input shaft in an oil path switching valve), FIG. 27 is a schematic diagram showing the relation between the output oil pressure and the steering wheel torque, FIG. 28 is a schematic diagram showing the relation between the oil pressure in a reaction plunger side chamber (a steering wheel torque) and the torsion angle of a torsion bar, FIG. 29 is a schematic diagram showing the relation between the oil pressure in the reaction plunger side chamber and the output oil pressure, FIG. 30 is a schematic diagram showing the relation between the steering wheel torque and the torsion angle of the torsion bar, FIG. 31 is a schematic diagram showing the flow rate on an inlet side of a control system and flow rates at various portions within the control system, FIG. 32 is a plan view showing reaction pistons of the prior art, FIG. 33 is a plan view showing reaction pistons according to the present invention, FIG. 34 is a schematic view for explaining the operation of the reaction pistons in FIG. 33, FIGS. 35 and 36 are schematic views for explaining the reason why a torsion torque can be arbitrarily preset according to the present invention, FIGS. 37 and 38 are schematic views showing other preferred embodiments of the grooves formed in the input shaft, FIG. 39 is a schematic diagram showing characteristics of the embodiment shown in FIGS. 35 and 36, FIG. 40 is a schematic diagram showing a characteristic of the embodiment shown in FIG. 37, FIG. 41 is a schematic diagram showing a characteristic of the embodiment shown in FIG. 38, and FIGS. 42 and 43 are schematic views showing still other preferred embodiments of the reaction pistons.

Now the present invention will be described in greater detail with reference to FIGS. 1 to 43 of the accompanying drawings. Explaining, at first, the outline of the power steering system according to the present invention with reference to FIG. 1, reference numeral (1) designates an oil pump driven by an engine (not shown), and this oil pump (1) is an oil pump whose flow rate is constant (about 7 l/min.) and whose delivery pressure is variable (5 kg/cm$^2$-70 kg/cm$^2$). In addition, reference numeral (2) designates a four way type oil path switching valve (rotary valve), numeral (3) designates a steering power cylinder, numeral (4) designates an oil tank, numeral (5) designates a plurality of reaction pistons, numeral (6) designates chambers formed on the rear side of the respective reaction pistons, numeral (7a) designates a high pressure oil path extending from the oil pump (1) to the oil path switching valve, numeral (8a) designates a low pressure oil path extending from the oil path switching valve (2) to the oil tank (4), numerals (9a) and (10a) designates oil paths extending from the oil path switching valve (2) to the steering power cylinder (3), reference character (a) designates a main orifice provided midway of the high pressure oil path, numeral (7b) designates a bypassing oil path connected to the high pressure oil paths (7a) on the upstream side and on the downstream side, respectively, of the main orifice (a), numeral (11) designates a change-over valve (COV) forming oil pressure increase means which is interposed in the midway of the same bypassing oil path (7b), numeral (12) designates a pressure control valve connected to the oil path (7b) on the upstream side of the change-over valve (11) via an oil path (7c), numeral (13) designates a flow rate control valve, numeral (7d) designates an oil path extending from the pressure control valve (12), and a pair of parallel oil paths (7e) and (7e') branched from the oil path (7d) extend to the above-mentioned flow rate control valve (13). In addition, reference numeral (7d$_1$) designates an auxiliary pilot oil path extending from midway of the oil path (7d) to the above-mentioned pressure control valve (12), numeral (7d$_2$) designates an oil path extending from midway of the oil path (7d) to the chambers (6) on the rear side of the aforementioned reaction pistons (5), numeral (7d$_3$) designates an oil path extending from midway of the above-mentioned oil path (7d) to the low pressure oil path (8b), reference characters (b) and (c) designate second and fourth orifices, respectively, provided midway of the above-mentioned oil path (7e), numeral (7e$_1$) designates a COV pilot oil path extending from the oil path (7e) between the orifices (b) and (c) to the above-mentioned change-over valve (11), reference character (e) designates a third orifice provided midway of the oil path (7d$_3$), numeral (7f) designates an oil path extending from the above-mentioned flow rate control valve (13) to the low pressure oil path (8b), reference character (d) designates a first orifice provided midway of the oil path (7f), numeral (7f$_1$) designates a main pilot oil path extending from the oil path (7f) on the upstream side of the first orifice (d) to the above-mentioned pressure control valve (12), numeral (14) designates a car speed sensor, numeral (15) designates a control apparatus, numeral (16) designates an ignition switch, numeral (17) designates an ignition coil, and numerals (18a) and (18b) designate wirings extendin from the ignition coil (17) to an electromagnetic coil (solenoid) of the above-mentioned flow rate control valve (13), the car speed sensor (14) is adapted to detect the car speed and transmit a pulse signal produced as a result of the detection (a pulse signal corresponding to car speed to the control apparatus (15), and the control apparatus (15) is adapted to send a current corresponding to the pulse signal (a current corresponding to a car speed which varies from a zero current (i=0) upon a predetermined high speed to a maximum current (i=1) upon stoppage) to an electromagnetic coil (solenoid) (57) of the flowrate control valve (13) and hold the plunger (52) and a spool (51) of the flow rate control valve (13) at a predetermined position corresponding to the aforementioned current value.

Next, the above-referred to oil path switching valve (2), change-over valve (11), pressure control valve (12) and flow rate control valve (13) will be described in more detail with reference to FIGS. 2 to 21. Reference numeral (20) in FIGS. 2 to 7 designates a valve housing, and the above-mentioned respective valves (2), (11), (12) and (13) are assembled within the same valve housing (20). Explaining, at first, the oil path switching valve (2) in detail with reference to FIG. 2, reference numeral (21) designates an input shaft which is manipulated by a steering wheel (not shown), numeral (23) in FIGS. 2 and 3 designates a cylinder block forming an output shaft which is rotatably supported within the valve housing (20) by means of upper and lower bearings, numeral (22) designates a torsion bar inserted within the above-mentioned input shaft (21), which is fixedly secured at its top to the input shaft (21) and at its bottom to the cylinder block (23), and owing to torsion of the torsion bar (22) the input shaft (21) and the cylinder block (23) can undergo a relative rotational movement through a certain angle. In addition, reference numeral (21a) designates a plurality of longitudinal grooves provided in the outer peripheral surface of the lower portion of the input shaft (21), and in the cylinder block (23) are provided cylinders opposed to the respective longitudinal grooves (21a), the aforementioned reaction pistons (5) are fitted in the respective cylinders, and projections provided at the tip ends of the respective reaction pistons (5) are engaged with the corresponding longitudinal grooves (21a). The chambers (6) on the rear side of the respective reaction pistons (5) are formed between the cylinder block (23) and the valve housing (20) and communicated with an annular groove (6').

Reference numeral (23a) designates a pinion formed integrally with the cylinder block (23), numeral (24a) designates a rack which is meshed with the pinion (23a) and in turn coupled to a piston rod of the power cylinder (3), numeral (24) designates a rack support, numeral (26) designates a cap, numeral (25) designates a spring interposed between the cap (26) and the rack support (24), numeral (28) designates a sleeve of the oil path switching valve (2) fixed within the valve housing (20) right above the aforementioned cylinder block (23), numerals (28a), (28b) and (28c) designate oil paths provided on the outer peripheral surface of the sleeve (28), numeral (27) designates a valve body fitted between the sleeve (28) and the input shaft (21), numeral (23b) designates a pin for connecting a bottom end portion of the valve body (27) with a top end portion of the cylinder block (23), and numerals (27a), (27b) and (27c) designate oil paths provided on the outer peripheral surface of the valve body (27).

In the above-described construction, when a steering wheel is placed at a neutral position, the high pressure oil path (7a) communicates with a chamber (29) between the input shaft (21) and the torsion bar (22) through the oil path (27a) in the valve body (27) and the oil path (28a) in the sleeve (28), and hence working oil supplied from the oil pump (1) will circulate through the route consisting of the high pressure oil path (7a)→the oil path (28a)→the oil path (27a)→the chamber (29) (the oil paths between the oil path (27a) and the chamber (29) being not shown)→the low pressure oil path (8a)→the oil tank (4)→the oil pump (1). If the input shaft (21) is rotated in the clockwise direction as viewed from the above relatively to the valve body (27) by rotating a steering wheel in the right turn direction, then the high pressure oil path (7a) communicates with the oil path (9a) for the power cylinder (3) through the oil path (28a) of the sleeve (28), the oil paths (27a) and (27b) of the valve body (27) and the oil path (28b) of the sleeve (28), while the low pressure oil path (8a) communicates with the oil path (10a) for the power cylinder (3) through the chamber (29), the oil path (27c) of the valve body (27) and the oil path (28c) of the sleeve (28), and hence the working oil supplied from the oil pump (1) is passed through the route consisting of the high pressure oil path (7a)→the oil path (28a)→the oil paths (27a) and (27b)→the oil path (28b)→the oil path (9a)→the left of the power cylinder (3), while the oil in the right chamber of the power cylinder (3) is returned through the route of the oil path (10a)→the oil path (28c)→the oil path (27c)→the chamber (29)→the low pressure oil path (8a)→the oil tank (4), so that the piston rod of the power cylinder (3) moves rightwardly, and thus steering in the right turn direction can be effected. On the other hand, if the input shaft (21) is rotated in the counterclockwise direction as viewed from the above relatively to the valve body (27) by rotating a steering wheel in the left turn direction, then the high pressure oil path (7a) communicates with the oil path (10a) for the power cylinder (3) through the oil path (28a) of the sleeve (28), the oil path (27c) of the valve body (27) and the oil path (28c) of the sleeve (28), while the low pressure oil path (8a) communicates with the oil path (9a) for the power cylinder (3) through the chamber (29), the oil path (27b) of the valve body (27) and the oil path (28b) of the sleeve (28), and hence the working oil supplied from the oil pump (1) is passed through the route consisting of the high pressure oil path (7a)→the oil path (28a)→the oil path (27c)→the oil path (28c)→the oil path (10a)→the right chamber of the power cylinder (3), while the oil in the left chamber of the power cylinder is returned through the route of the oil path (9a)→the oil path (28b)→the oil path (27b)→the chamber (29)→the low pressure oil path (8a)→the oil tank (4), so that the piston rod of the power cylinder (3) moves leftwardly, and thus steering in the left turn direction can be effected.

When a steering wheel is rotated through a certain fixed angle in a desired direction, as described above the piston rod of the power cylinder (3) is moved in the left or right direction as a result of a relative angular displacement between the input shaft (21) and the output shaft (23) and thereby steering in the desired direction can be effected. During this movement of the piston rod, since the piston rod of the power cylinder (3) is coupled to the rack (24a) as referred to previously, the output shaft (23) is rotated via the rack (24a) and the pinion (23a) in the direction for following the rotation of the input shaft (21) until the relative angular displacement therebetween becomes zero, that is, the torsion of the torsion bar (22) becomes zero, when the supply route of the working oil to the power cylinder (3) is cut off in the oil path switching valve (2), and hence the power steering system holds a steering condition of a fixed angle. On the contrary, when the steering wheel is returned from the steering position of the fixed angle to a neutral position, also a similar operation is effected. Such a structure and an operation of the oil path switching valve in a power steering system has been well known in the prior art, and the details of the structure and operation are disclosed, for instance, in U.S. Pat. No. 3,800,407 granted to P. J. Duneah on Apr. 2, 1974.

Now, the change-over valve (11) forming oil pressure increase means will be described in more detail. As will be apparent from FIGS. 4, 5, 7 and 8(I), the change-over valve (11) is interposed midway of the bypassing oil path (7b) for the orifice (a). This change-over valve (11) includes a spool (30) having an annular groove (30a) (this annular groove (30a) forming a part of the oil path (7b)), a cap (31), a spring (33) interposed between spool (30) and cap (31), and an O-ring (34). Here it is to be noted that in FIG. 4 the spool (30) is shown at its position occupied upon low speed driving and when steering is effected upon high speed driving, while in FIG. 7 it is shown at its position occupied when steering is not effected upon high speed driving. The arrangement for the spool (30) is such that if the oil pressure in the pilot oil path ($7e_1$) (See FIGS. 1 and 8(I)) rises, then the spool (30) may advance against the spring (33) to open the bypassing oil path (7b), while if the oil pressure in the pilot oil path ($7e_1$) fails, then the spool (30) may retract being pushed by the spring (33) to close the bypassing oil path (7b).

Next, the above-referred to pressure control valve (12) will be explaihed in more detail. As will be apparent from FIGS. 5, 6 and 8(I), the pressure control valve (12) includes a sleeve (40), a spool (41), a cap (42), a stop (43), a spring (44) interposed between the spool (41) and the stop (43), and a member (45) fixedly mounted within the spool (41) and having a first orifice (d). As shown in FIGS. 9, 10, 19 and 20, the spool (41) is provided with three annular grooves (41a), (41b) and (41c), and the annular groove (41a) is opposed to the oil path (7c) branched from the bypassing oil path (7b) on the upstream side of the change-over valve (11). In addition, reference numeral (41d) designates a chamber extending upwardly from the first orifice (d) within the spool (41), numeral (41e) designates an oil path connecting the chamber (41d) with the above-mentioned annular groove (41c) (these oil paths (41d), (41e) and (41c) forming a part of the low pressure oil path (8b)), and the annular groove (41c) is opposed to the low pressure oil path (8b) on the side of the valve housing (20) which oil path extends obliquely downwards as shown in FIG. 6 from the low pressure oil path (8a) formed right above the valve body (27) of the oil path switching valve (2) shown in FIG. 2.

The above-mentioned annular groove (41a) communicates with the chamber (41d) through an orifice (e). The sleeve (40) is provided with a notch (40a) having a through-hole (40a'), a notch (40b) having a through-hole (40b'), a notch (40c) having through-holes (40c') and (40c''), a notch (40d) having a second orifice (b), and a notch (40e) having a through-hole (40e') in succession from above to below at different positions in the circumferential direction on the outer peripheral surface, as shown in FIGS. 11 to 17.

The aforementioned respective annular grooves (41a), (41b) and (41c) are arranged relative to the spool (41) in such manner that the notch (40a) having the through-hole (40a') connects the annular groove (41c) of the spool (41) with the low pressure oil path (8b) on the side of the valve housing (20), the notch (40b) having the through-hole (40b') connects the annular groove (41a) of the spool (41) with the oil path (7c) on the side of the valve housing (20), the notch (40c) having the through-holes (40c') and (40c'') connects the annular grooves (41a) and (41b) of the spool (41) with each other, the notch (40d) having the second orifice (b) connects the annular groove (41b) of the spool (41) with the oil path (7e) on the side of the valve housing (20), and the notch (40e) having the through-hole (40e') connects the annular groove (41b) of the spool (41) with the oil path (7d) on the side of the valve housing (20) shown in FIGS. 3 and 5. In addition, the arrangement is such that the working oil flowing out through the first orifice (d) into the chamber (41d) of the spool (41) returns to the oil tank (4) through the route consisting of the oil path (41e)→the annular groove (41c)→the through-hole (40a')→the notch (40a)→the low pressure oil path (8b) on the side of the valve housing (20), that the working oil flowing from the bypassing oil path (7b) through the oil path (7c) into the notch (40b) flows towards the flow rate control valve (13) and the reaction pistons (5) through the route consisting of the through-hole (40b')→the annular groove (41a)→the notch (40c)→the through-hole (40c'')→the annular groove (41b)→the through-hole (40e')→the notch (40e)→the oil path (7d) in the valve housing (20), and that the working oil further flow from the above-mentioned notch (40c) through the oil path (7d$_2$) towards the reaction pistons (5). Furthermore, a part of the working oil flowing through the above-mentioned annular groove (41b) passes through the route consisting of the orifice (b)→the notch (40d)→the oil path (7e) on the side of the valve housing (20) to act upon the rear side of the spool (30) in the above-mentioned change-over valve (11) as a pilot pressure (See (7e$_1$) in FIG. 5), and further it flows towards the flow rate control valve (13) through the route consisting of the oil path (30b) (See FIG. 8(I)) provided at the rear end portion of the spool (30)—the oil path (7e) on the side of the valve housing (20).

Now, the above-referred flow rate control valve (13) will be explained in greater detail. As will be apparent from FIGS. 5, 8 and 21, the flow rate control valve (13) is disposed right under the above-described pressure control valve (12) with their axes aligned with each other. The flow rate control valve (13) includes a sleeve (50), a spool (51), a plunger (52) made of non-magnetic material, a member (53) made of magnetic material that is integral with the plunger (52), a lock nut (54) for fixedly fastening the spool (51) to the plunger (52), a washer (55) butting against the sleeve (40) of the above-described pressure control valve (12), a back-up spring (56) interposed between the washer (55) and the sleeve (50), an electromagnetic coil (57), a nut (58) fixedly mounted to a casing on the side of the electromagnetic coil (57), a plunger pushing force regulation bolt (59) threadedly engaged with the nut (58), a spring (60) interposed between the bolt (59) and the plunger (52), and a lock nut (61) for fixedly fastening the assembly of the above-described flow rate control valve (13) to the valve housing (20). As shown in FIG. 21, the sleeve (50) is provided with an annular oil path (50a) communicating with the oil path (7d) on the side of the valve housing (20) (See FIG. 5) and an annular oil path (50b) communicating with the oil path (7e) on the side of the valve housing (20), and in the oil path (50b) is formed an orifice (c). In addition, the above-mentioned spool (51) is provided with an annular oil path (51a) formed along the entire circumference and having a tilted groove (51a') which is formed along only a part of the circumference, and a through-hole (51b), and the above-mentioned plunger (52) is provided with an oil path (52a) communicating with the through-hole (51b), a through-hole (52b) and an oil path (52c) directed in the axial direction.

As described previously, the working oil flowing from the oil path (7d) on the side of the valve housing (20) through the oil path (7e') towards the flow rate control valve (13) enters the oil path (50a) in FIG. 21, while the working oil flowing through the oil path (7e) in the valve housing (20) shown in FIG. 5 towards the flow rate control valve (13) enters the oil path (50b) in FIG. 21. FIG. 21 shows the condition of high speed driving, where only the working oil entering the oil path (50b) will flow towards the member (45) on the side of the orifice (d) through the route consisting of the orifice (c)→the oil path (51a)→the through-hole (51b)→the oil path (52a)→the through-hole (52b)→the oil path (52c). However, when the condition changes from a high speed driving condition to a low speed driving condition, the spool (51) lowers, and thereby the amount of opening of the orifice (c) is decreased, while the amount of opening of the oil path (50a) is increased. Eventually, under a stop condition, only the oil path (50a) is opened.

Reference symbol $Q_0$ in FIG. 1 represents the flow rate on the delivery side of the oil pump (1), symbol $Q_1$ represents the flow rate of the oil flow entering the oil path switching valve (2) through the high pressure oil path (7a), symbol $Q_2$ represents the flow rate through the oil path (7c), symbol $Q_3$ represents the flow rate through the oil path (7e') (the oil path (50a)), symbol $Q_4$ represents the flow rate on the downstream side of the orifice (c), symbol $Q_5$ represents the flow rate on the downstream side of the orifice (e), and the ratio of $Q_1:Q_2$ is equal to about 6:1. In addition, the flow rate $Q_2$ through the oil path (7c) fulfills the equation of $Q_2=Q_3+Q_4+Q_5$ (See FIG. 31).

The diameter of the sleeve (50) of the flow rate control valve (13) is varied at its upper, middle and lower portions as shown in FIG. 21, the diameters being successively reduced towards the upper portion and differences ($D_1$) and ($D_2$) are present therebetween. On the other hand, the sleeve fitting bore on the side of the valve housing is also provided so as to conform with the sleeve. Such provision is made for the purpose of facilitating insertion of the sleeve (50) into the sleeve fitting bore by reducing frictional resistance upon inserting the sleeve (50) associated with O-rings (62) into the valve housing (20), and also for the purpose of preventing the respective O-rings (62) from being forced out and being pinched between the sleeve (50) and the valve housing (20) upon insertion of the sleeve (50).

In FIGS. 22, 23 and 24 is shown a filter (70). This filter (70) consists of a frame (71) and a wire netting (72), and is mounted by fitting at the notch (40b) provided in the sleeve (40) of the pressure control valve (12) (See FIGS. 9 and 13), that is, at the inlet of the control system oil path to prevent foreign matters such as dust from entering the control system oil path. It is to be noted that although such type of filter could be disposed at the inlet of the high pressure oil path (7a) provided in the valve casing (20) (See the portion marked by an arrow in FIG. 4), in that case it is necessary to make the filter large-sized because the total delivery flow rate of the oil pump passes through the filter, and so, it is difficult to accommodate such a large-sized filter by making use of the illustrated space.

It is also to be noted that the reason why the inlet of the high pressure oil path (7a) is made large in diameter is for the purpose of facilitating machining of the orifice (a) and the oil path (7b) branched in two directions by inserting a drill through this inlet and also for the purpose of facilitating coupling work with a piping (not shown). In addition, other oil paths such as (7b) [the oil path (7b) on the downstream side of the change-over valve (11)], (7c), (7d) and (7e) are also formed by drilling bores in the longitudinal and lateral directions in the valve housing (20) and then plugging the bores as will be seen in FIGS. 3, 4 and 5, and in this respect also, machining of the oil paths is facilitated. It is to be noted that reference character (Z) in FIGS. 2, 3, 4, 6 and 7 designates the center axis of the oil path switching valve (2) and character ($Z_1$) in FIGS. 2 and 5 designates the center of meshing between the pinion (23a) and the rack (24a).

One example of the above-referred control apparatus (15) is shown in FIG. 25. Reference numeral (80) designates a constant voltage power supply circuit, numeral (81) designates a pulse-voltage converter circuit for sending a voltage proportional to a car speed, numeral (82) designates an error amplifier circuit, numeral (83) designates a transistor, numeral (84) designates a reset circuit which resets a timer circuit (87) at a car speed other than zero and which sets the timer circuit (87) at a zero car speed, numeral (85) designates a pulse-voltage converter circuit for sending a voltage proportional to a rotational speed of an engine, numeral (86) designates an engine rotational speed set circuit which sets the timer circuit (87) into a start condition when the engine rotational speed is equal to or higher than 2000 rpm and resets the timer circuit (87) into an OFF condition when the engine rotational speed is lower than 2000 rpm, numeral (88) designates a car speed input wire cut-off detector circuit which takes an ON condition upon absence of car speed pulses, numeral (89) designates a transistor, numeral (90) designates a relay, and numeral (91) designates a negative feedback circuit for stabilizing the current flowing through the electromagnetic coil (57) of the flow rate control valve (13). In general, the condition where the engine rotational speed is equal to or higher than 2000 rpm at a zero car speed, cannot exist normally. Therefore, if this condition should continue 5-10 seconds or more, then it is judged that some fault (for instance, a fault in the car speed pulse system or a fault in a flow rate control valve system) has arisen, and feed of current to the flow rate control valve (13) (the electromagnetic coil (57)) is interrupted by turning the relay (90) ON.

Accordingly, owing to this control circuit, current feed to the flow rate control valve (13) is interrupted upon occurrence of a fault, and hence manipulation of the steering wheel becomes heavy during high speed driving (providing a fail-safe function), resulting in a safe operation.

Next, the operation of the above-described power steering system will be explained. When the steering wheel is rotated from its neutral position in the right-turn or left-turn direction and thereby the relative angular displacement of the input shaft (21) with respect to the valve body (27) is increased, then the output oil pressure of the oil path switching valve (2) (the delivery pressure of the oil pump (1)) $P_p$ will rise along a quadratic curve as shown in FIG. 26. The influence of this delivery pressure $P_p$ of the oil pump (1) appears in the oil path (7d) which is on the downstream side of the oil paths (7a), (7b) and (7c) and the pressure control valve (12) and which is on the upstream side of the orifices (b) and (e), the flow rate control valve (13) and the chambers (6) associated with the reaction pistons (5), and hence the oil pressure in the oil path (7d) rises in a similar manner.

The above-mentioned pressure control valve (12) controls the delivery pressure $P_p$ of the oil pump (1) according to a pilot oil pressure in the auxiliary pilot oil path ($7d_1$) on the downstream side of the valve itself to produce a controlled oil pressure Pc which is limited to be equal to or lower than a highest oil pressure, and also the valve (12) controls the highest pressure of the controlled oil pressure Pc as shown in FIG. 29 according to a main pilot oil pressure in the oil path ($7f_1$) on the downstream side of the flow rate control valve (13).

If the car is in a stopped condition, then the control apparatus (15) sends a current of i=1A (See FIG. 29) to the flow rate control valve (13) in response to a pulse signal applied from the car speed sensor (14) and thereby the plunger (52) and the spool (51) are lowered to the lower limit position (moved up to the position L in FIG. 1), so that only the oil path (50a) in FIG. 21 is communicated with the oil path (7f) on the upstream side of the orifice (d) via the oil paths (51a), (51b) and (52b) on the side of the spool (51) to make the oil pressure in the oil path (7f) equal to the oil pressure Pc in the oil path (7d). Under the above-mentioned stopped condition, if the steering wheel begins to be rotated in the right-turn (or left-turn) direction, then the oil pressure Pc in the oil path (7d) begins to rise. Then the oil pressure in the oil path (7f) also rises in a similar manner. This oil pressure is in itself transmitted to the spool (41) (the smaller diameter end of the spool (41)) of the pressure control valve (12) via the main pilot oil path ($7f_1$), and so the spool (41) is pushed in the direction of arrows in FIG. 10. At the same time, the working oil passing through the annular groove (41b) of the spool (41) pushes the spool (41) in the direction of the arrows in FIG. 10 owing to a difference in the pressure acting area. On the other hand, the side of the spring (44)

communicates with the low pressure oil path (8b), hence the spool (41) rises successively (moves in the direction of L in FIG. 1) against the spring (44), the extent of opening of the through-hole (40b') decreases successively, and when the above-mentioned oil pressure pushing the spool (41) upwardly and the resilient force of the spring (44) balance with each other, the spool (41) will stop. Under this condition, the maximum value of the oil pressure Pc in the oil path (7d) (in the chambers (6) associated with the reaction pistons (5)) becomes lowest. If the steering wheel is further rotated in the right-turn (or left-turn) direction and the oil pressure $P_p$ in the oil paths (7a), (7b) and (7c) rises further, then in the pressure control valve (12) the spool (41) is moved in the direction of further reducing the content of opening of the through-hole (40b') owing to a difference in a pressure acting area for the oil pressure $P_p$ acting upon the annular groove (41b), and so the oil pressure Pc in the oil path (7d) is continuously maintained at the above-mentioned constant low level. Accordingly, when the above-mentioned relative angular displacement is increased and thereby a large output oil pressure $P_p$ is provided, the steering wheel torque T which is determined by the oil pressure Pc in the chambers (6) associated with the reaction pistons (5) and the torsion angle of the torsion bar (22), will not become large (See Curve (A) in FIG. 27). In the above-mentioned case of steering under a stopped condition, although the oil pressure Pc in the oil path (7d) is low as described previously, since the spool (51) (See FIG. 21) is at a lowered position, the fourth orifice (c) is blocked and the working oil will not flow through the oil path (7e). Accordingly, the oil pressure in the COV pilot oil path (7e₁) becomes the same pressure as the pressure Pc, hence owing to this pressure the change-over valve (11) opens the bypassing oil path (7b) against the resilient force of the spring (33), and the valve (11) is held at the position L in FIG. 1. It is to be noted that in FIG. 1 the change-over valve (11) is illustrated at its position H.

If the car is brought into a low speed driving condition, the control apparatus (15) receives a pulse signal sent from the car speed sensor and sends a current corresponding to the car speed at each moment such as, for instance, a current of i=0.8A to the flow rate control valve (13) to raise the plunger (52) and the spool (51) from the lower limit position by a distance corresponding to the above-mentioned current value (to move them in the rightward direction in FIG. 1) and thereby decrease the amount of opening of the oil path (50a) on the side of the sleeve (50) shown in FIG. 21. At this moment, the orifice (c) and the oil path (50b) on the side of the sleeve (50) are still kept blocked, and owing to the decrease of the amount of opening of the oil path (50a), the flow rate $Q_3$ passing through the orifice (d) is reduced as compared to the flow rate passing through the oil path (50a) under the above-mentioned stopped condition (the flow rate $Q_4$ being nearly zero under this condition). It is to be noted that the amount of this flow rate decrease is absorbed by an increase of the flow rate $Q_5$ of the flow passing through the orifice (e) to the low pressure oil path (8b). Since the flow rate $Q_3$ ($Q_4 \approx 0$) of the flow coming out of the flow rate control valve (13) is reduced as compared to the flow rate of the flow passing through the oil path (50a) under the above-mentioned stopped condition as described above, the oil pressure on the upstream side of the orifice (d) becomes lower than that under the stopped condition.

If the steering wheel begins to be rotated in the right-turn (or left-turn) direction under the above-described low speed condition, then the oil pressure Pc in the oil path (7d) begins to rise. Then the main pilot oil pressure in the oil path (7f) will also rise. This oil pressure is in itself transmitted via the main pilot oil path (7f₁) to the spool (41) (the smaller diameter end of the spool (41)) of the pressure control valve (12), and so the spool (41) is pushed in the direction of the arrows in FIG. 10. At the same time, the working oil passing through the annular groove (41b) of the spool (41) pushes the spool (41) in the direction of arrows in FIG. 10 owing to a difference in a pressure acting area. On the other hand, the side of the spring (44) communicates with the low pressure oil path (8b), hence the spool (41) rises successively (moves in the direction of L in FIG. 1) against the spring (44), the extent of opening of the through-hole (40b') decreases successively, and when the above-mentioned oil pressure pushing the spool (41) upwardly and the resilient force of the spring (44) balance with each other, the spool (41) will stop. However, the oil pressure pushing the smaller diameter end of the spool (41) is lower than that under the above-described stopped condition, hence the distance of rise of the spool is decreased by the corresponding amount (the extent of opening of the through-hole (40b') being increased by the corresponding amount), and the oil pressure Pc in the oil path (7d) and the chambers (6) associated with the reaction pistons (5) becomes higher than that under the above-mentioned stopped condition. This condition still continues thereafter, that is, if the steering wheel is further rotated in the right-turn (or left-turn) direction resulting in further rise of the oil pressure $P_p$ in the oil paths (7a), (7b) and (7c) and the oil pressure in the annular groove (41b) tends to increase, then in the pressure control valve (12) the spool (41) is further moved to limit the extent of opening of the through-hole (40b'), and hence, the oil pressure Pc in the oil path (7d) is continuously maintained at a constant level which is higher than that under the stopped condition.

Accordingly, when a large delivery pressure $P_p$ is provided by increasing the above-mentioned relative angular displacement, though the steering wheel torque T becomes larger than that under the stopped condition, it does not become so large as that under the high speed condition as will be described later.

If the car is brought into a high speed condition at a predetermined speed, then the control apparatus (15) sends a current of i=0 (See FIG. 29) to the flow rate control valve (13) in response to a pulse signal transmitted from the car speed sensor (14), to raise the plunger (52) and the spool (51) up to its upper limit position (to move them up to the position H illustrated in FIG. 1) by means of the spring (60), and thereby only the fourth orifice (c) in FIG. 21 is communicated with the oil path (7f) on the upstream side of the first orifice (d) via the oil paths (51a), (51b) and (52b) on the side of the spool (51). At this moment, the fourth orifice (c) is fully opened, and while the flow rate $Q_4$ through the fourth orifice (c) is increased, it is increased only a little as compared to the flow rate under the above-mentioned low speed condition. On the other hand, the flow rate $Q_3$ through the oil path (50a) becomes nearly zero, and therefore, the flow rate through this system becomes minimum. It is to be noted that this decrease of the flow rate is absorbed by further increase of the flow rate $Q_5$ of the oil flow through the third orifice (e) to the low pressure oil path (8b) (See FIG. 31). Since the flow rate of the oil flow coming out of the flow rate control valve (13) is reduced to the minimum as described above, the main pilot oil pressure in the oil path (7f) on the upstream side of the first orifice (d) becomes lowest. As this oil pressure is fed to the pressure control valve (12) via the oil path (7f$_1$), the highest pressure of the oil pressure Pc whose highest pressure is limited by the pressure control valve (12) takes the maximum value (See FIG. 24).

If the steering wheel begins to be rotated in the right-turn (or left-turn) direction under the above-mentioned high speed condition, then the oil pressure Pc in the oil path (7d) begins to rise. Then the oil pressure in the oil path (7f) also rises. However, since the oil path (50a) is blocked, the amount of the pressure rise is extremely small. This oil pressure is in itself transmitted to the spool (41) (the smaller diameter end of the spool (41)) of the pressure control valve (12) via the main pilot oil path (7f$_1$), and so the spool (41) is pushed in the direction of arrows in FIG. 10. At the same time, the working oil passing through the annular groove (41b) of the spool (41) pushes the spool (41) in the direction of arrows in FIG. 10 owing to a difference in a pressure acting area. On the other hand, the side of the spring (44) communicates with the low pressure oil path (8b), hence the spool (41) will rise successively (move in the direction L in FIG. 1) against the spring (44), resulting in successive reduction of the extent of opening of the through-hole (40b'), and when the oil pressure pushing the spool (41) in the above-mentioned direction of the arrows balances with the resilient force of the spring (44), the spool (41) will stop. However, the oil pressure pushing the smaller diameter end of the spool (41) is lowest, hence the distance of rise of the spool (41) is very small (the extent of opening of the through-hole (40b) being large), and the highest pressure for the oil pressure Pc in the oil path (7d) (in the chambers (6) associated with the reaction pistons (5)) becomes highest.

On the other hand, as the orifice (c) is opened to the oil path (51a), when the delivery pressure P$_p$ itself is low, especially in the case where the steering wheel is in the proximity of its neutral position, the COV pilot pressure in the oil path (7e) between the orifices (b) and (c) is lowered, and this lowered pressure is transmitted to the spool (30) of the change-over valve (11) via the COV pilot oil path (7e$_1$), accordingly the spool (30) is lowered (the position H in FIG. 1 being selected) to close the bypassing oil path (7b), so that the working oil supplied from the oil pump (1) is sent to the oil path switching valve (2) via the main orifice (a) and the delivery oil pressure P$_p$ is raised by a preset pressure. This implies that even when steering is not effected (the steering wheel being held at its neutral position) under a high speed condition, the delivery pressure P$_p$ in the oil paths (7a), (7b) and (7c) rises as compared to that under a stopped condition or a low speed condition (See P$_{p1}$ in FIG. 27). This oil pressure is transmitted to the chambers (6) associated with the reaction pistons (5) via the pressure control valve (12) and the oil paths (7d) and (7d$_2$), and so the reaction feeling (reaction to the hands) upon minute angle steering under a high speed condition can be improved.

If the steering wheel is further rotated continuously in the right-turn (or left-turn) direction, the delivery pressure P$_p$ in the oil paths (7a), (7b) and (7c) rises further and the oil pressure Pc in the oil path (7d) also rises further in a similar manner to that described above. If the oil pressure in the oil path (7e) between the orifices (b) and (c) rises higher than a preset value and thus the force acting upon the spool (30) via the pilot oil path (7e$_1$) becomes larger than the resilient force of the spring (33), then the spool (30) of the change-over valve (11) rises (the position L in FIG. 1 being selected) to open the bypassing oil path (7b). If the steering wheel is further rotated continuously in the right-turn (or left-turn) condition even after the above-mentioned condition has been realized, then the oil pressure P$_p$ in the oil paths (7a), (7b) and (7c) will rise further. However, the pressure control valve (12) controls the extent of opening of the through-hole (40b'), and hence the oil pressure Pc in the oil path (7d) can be continuously maintained at the highest constant level. Accordingly, the steering wheel torque T for providing a large delivery pressure P$_p$ by increasing the above-mentioned relative angular displacement becomes large (See curve (B) in FIG. 27).

As described above, the power steering system shown in FIGS. 1 to 25 comprises, in a power steering system of the type in which movement of a steering wheel is transmitted via a torsion bar (22) to an oil path switching valve (2) to actuate a power cylinder (3) in a desired steering direction by switching a high pressure oil path (7a) extending from an oil pump (1) to the oil path switching valve (2) and a low pressure oil path (8a) extending from the same oil path switching valve (2) to an oil tank (4) and a part of working oil flowing through the high pressure oil path (7a) is led to a reaction piston (5) to restrain torsion of the torsion bar (22), parallel oil paths (7e) and (7e') branched from midway of the oil paths (7a), (7b) and (7c), a second orifice (b) provided in one (7e) of the parallel oil paths (7e) and (7e'), a flow rate control valve (13) for discharging the working oil fed from the parallel oil paths according to a car speed so as to be proportional to the latter, a first orifice (d) for generating a main pilot pressure depending upon a flow rate on the downstream side of the same flow rate control valve (13), and a pressure control valve (12) actuated by the same main pilot pressure for controlling the oil pressure in the oil path (7d) extending to the above-mentioned reaction piston (5) to be constant and to take the higher constant value as a car speed is raised, and hence upon steering under a stopped condition the oil pressure applied to the reaction piston (5) becomes minimum. Therefore, upon steering under a stopped condition, one can drive the oil path switching valve (2) with only a small steering force (steering wheel torque).

In addition, as the car speed rises, the oil pressure applied to the reaction piston (5) is raised. Therefore, under a high speed condition the oil path switching valve (2) must be driven with a relatively large steering force, and so, under a high speed condition an appropriate reaction to the hands (feeling of a reaction force) can be obtained.

Furthermore, since the output pressure (the delivery pressure of the pump) P$_p$ is led to the reaction piston (5) via the pressure control valve (12), the output oil pressure P$_p$ presents a linear characteristic with respect to a steering wheel torque T within a range of steering under a running condition as shown by curve (B) in FIG. 27. Accordingly, the feeling of oversteering which is often encountered in the case of the conventional power steering system is not present, and hence steering under a running condition is extremely stabilized, and steering matched with the steering feeling can be realized.

Moreover, under a high speed condition, even if a steering wheel is in a neutral condition, as the oil pressure applied to the reaction piston (5) is raised by a predetermined value by means of the change-over valve (11), the neutral feeling of the steering wheel can be obtained under a high speed condition.

Furthermore, when a large degree of steering is effected by manipulating the steering wheel under a high speed condition, since the change-over valve (11) is actuated to open the bypassing oil path (7b), it is possible to make the output oil pressure $P_p$ act upon the power cylinder (3) via the oil path switching valve (2) without generating a reaction loss. In essence, although the pressure rise caused by the orifice (a) and closure of the change-over valve (11) is effective for improving the feeling of reaction under a high speed condition, it will cause a pressure loss for the power cylinder (3). However, according to the present invention, it is possible not to avoid the pressure loss upon steering under a high speed condition where an output higher than a predetermined value is necessitated for the power cylinder (3) and to reliably enhance the feeling of reaction only in the proximity of the neutral position of the steering wheel where the output oil pressure is low and thereby improve the feeling of rigidity.

Now, a description will be given in more detail with respect to the portion of the reaction pistons (5) which are most characteristic of the present invention. If the reaction pistons (5) are not provided around the torsion bar (22) connecting the input shaft (21) with the cylinder block (23), a neutral holding force is not present, and if an attempt is made to increase the reaction to the hands upon running, then the steering force under a stopped condition becomes large. However, as described previously, if a plurality of reaction pistons (5) are disposed around the input shaft (21) and the oil pressure controlled depending upon the car speed signal is led to the chambers (6) behind the respective reaction pistons (5), then it is possible to make the steering force under a stopped condition small, to increase the neutral holding force and the steering reaction force during running and to thereby improve the feeling of steering. However, in the prior art (See FIG. 32), a plurality of reaction pistons (a) are disposed so as to pinch the two wing portions of an input shaft (6) from the opposite sides. Whereas, according to the present invention (See FIGS. 3, 33 and 34), a plurality of reaction pistons (5) constituted by a cylindrical main body 501 and a protrusion 502 in the shape of a body of revolution around axis X—X are disposed around the input shaft (21) radially and at an equal interval in the circumferential direction. Therefore, between the respective arrangements of the reaction pistons there exists the following difference in effects and advantages. At first, explaining the reaction effect, a torsion torque T' in the prior art arrangement shown in FIG. 32 is represented by the following equation:

$$T' = \frac{nFR}{2}$$

(a number of reaction pistons: n, a number of effective pistons: n/2)

On the other hand, the torsion torque T in the reaction piston arrangement according to the present invention shown in FIG. 33 is represented by the following equation:

T = n.p.r (a number of reaction pistons: n, a number of effective pistons: n)

$$p = \frac{F}{\sin \theta} \quad r = R \cos \theta$$

$$\text{hence } T = \frac{nFR}{\tan \theta}.$$

Accordingly, the reaction effects are compared by the following equation:

$$\frac{T}{T'} = \frac{2}{\tan \theta}$$

In other words, even if the numbers of reaction pistons are the same in the respective reaction piston arrangement, T>T' can be realized by selecting the angle $\theta$ to be small. The examples of the ratio of the torsion torques are enumerated as follows:

| | |
|---|---|
| $\theta = 30°$ | T/T' = 3.46 |
| $\theta = 45°$ | T/T' = 2.0 |
| $\theta = 60°$ | T/T' = 1.15 |
| $\theta = 75°$ | T/T' = 0.54 |

Now, a description will be given on the point that the torsion torque T can be arbitrarily set according to the present invention. In the case where the input shaft (21) has been twisted by an angle $\phi$ with respect to the cylinder block (23) (See FIG. 36), assuming that the cross-section of the edges of the grooves in the input shaft (21) are linear, the groove UVW moves to the position U'V'W' and the contact point between the reaction piston (5) and the groove UVW moves from the position A to the position A'. In other words, the reaction piston (5) retracts by a distance $\delta$ and the contact point on the groove moves from A to A'. Accordingly, the torsion torque T produced by the reaction piston (5) can be arbitrarily set by varying the angle $\theta$ of the groove so that the contact point between the reaction piston (5) and the groove will come within the range of A—A" in FIG. 36, assuming that A" represents a point on line UV which fulfils the relation of A"V=A'V'. It is to be noted that FIG. 35 shows a neutral condition of the reaction piston (5). In addition, FIG. 37 shows another preferred embodiment of the groove, in which the protrusion of the reaction piston (5) is made to butt against the central bottom portion of the groove, and FIG. 38 shows still another, preferred embodiment of the groove in which the protrusion of the reaction piston (5) is made to butt against the both side portions of the groove. FIGS. 39, 40 and 41 show the characteristics of the reaction pistons (5) illustrated in FIGS. 35 and 36, in FIG. 37 and in FIG. 38, respectively. FIG. 42 illustrates still another preferred embodiment in which the cross-section of the edges of the groove are made linear and on the other hand the reaction piston (5) is constituted by the cylindrical body 501 and the protrusion 502 in the form of a body of revolution about an X—X axis and having a convexly curved cross-sectional profile and a maximum dimension transverse to said X—X axis which is substantially less than the diameter of cylindrical body 501, so that the characteristic of the torsion torque T can be arbitrarily set, and FIG. 43 illustrates yet another preferred embodiment in which the reaction piston (5) is formed of a reaction piston main body (5a) and a spherical body (5b) separate from and seated in a spherical recess in main body (5a) and constituting the body of revolution about axis X—X.

What is claimed is:

1. A power steering system comprising: a cylindrical input shaft for being driven by a steering wheel, and output shaft, a torsion bar extending through the inside of said cylindrical input shaft with one end fixedly secured to one end portion of said input shaft and the other end projecting from the other end portion of the input shaft for transmitting rotation of the input shaft to said output shaft, an oil path switching valve in which oil paths are switched according to the rotational angle difference between said input shaft and said output shaft, a power cylinder coupled to said output shaft, a high pressure oil path for supplying working oil delivered from an oil pump to said power cylinder via said oil path switching valve, a cylindrical portion on said output shaft surrounding the end portion of the output shaft end of said input shaft, four reaction pistons disposed in said cylindrical portion having their center lines lying in a plane perpendicular to the center axis of said input shaft and arrayed radially at equal intervals in the circumferential direction of said cylindrical portion, each said reaction pistons consisting of a cylindrical main body and a protrusion in the shape of a body of revolution around the longitudinal axis of said cylindrical main body attached to the inner end of the said main body, said body of revolution having a convexly curved cross-sectional profile and a maximum dimension transverse to said longitudinal axis which is substantially less than the diameter of said cylindrical main body, a control oil path branched from said high pressure oil path and communicating with said reaction pistons, and a plurality of longitudinal grooves in the outer peripheral surface of the end portion of the output shaft end of said input shaft parallel to the center axis of the input shaft and engaged by the protrusions on said reaction pistons.

* * * * *